UNITED STATES PATENT OFFICE.

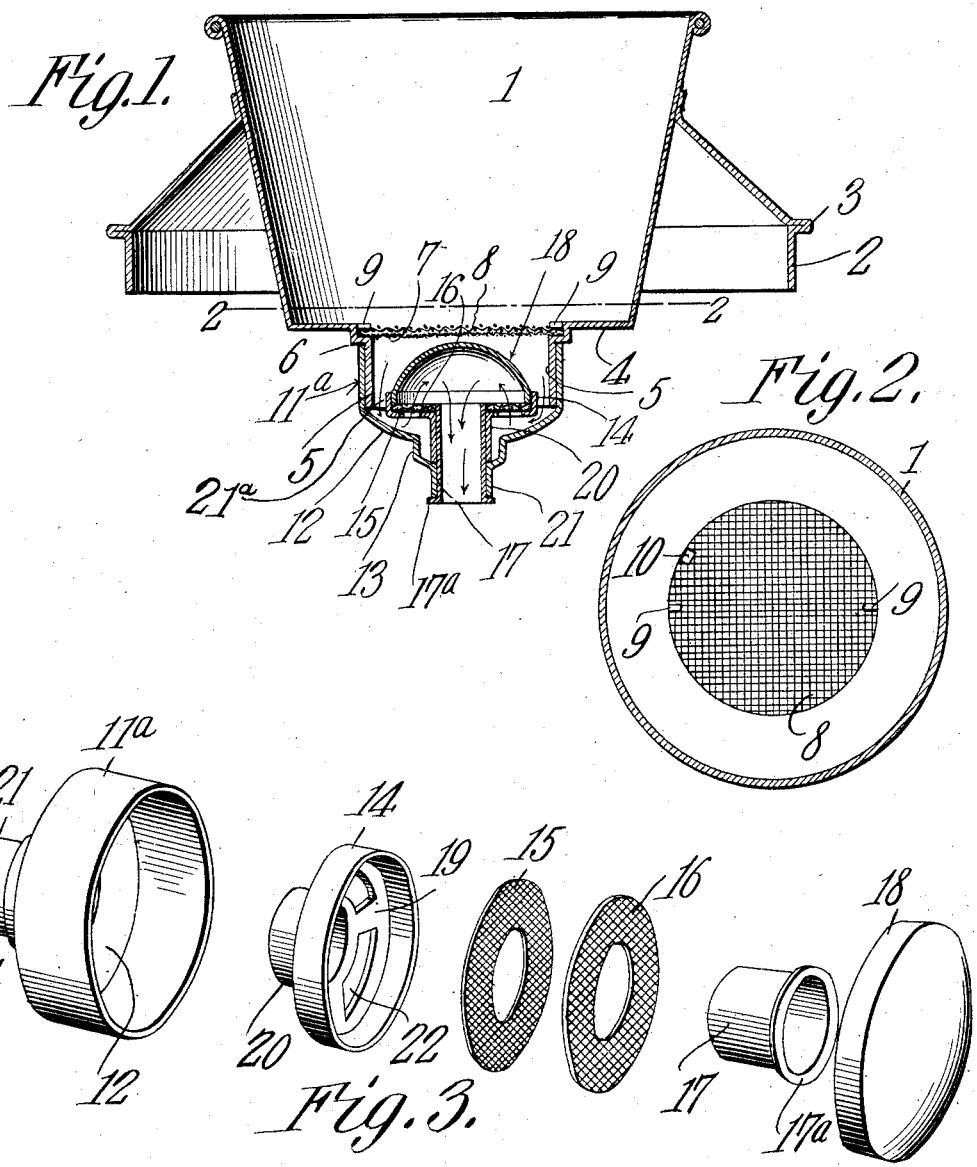

WILLARD JONES, OF AUBURN, MAINE.

STRAINER.

No. 864,787.    Specification of Letters Patent.    Patented Sept. 3, 1907.

Application filed June 8, 1907. Serial No. 377,992.

*To all whom it may concern:*

Be it known that I, WILLARD JONES, a citizen of the United States, residing at Auburn, in the county of Androscoggin and State of Maine, have invented a new and useful Strainer, of which the following is a specification.

This invention relates to strainers for milk pails.

The object of the invention is to provide a simple and thoroughly efficient form of strainer which shall be capable of assemblage with a pail and in which the passage of foreign or extraneous matter of any kind to the pail will be positively prevented, and whereby further the thorough straining of the milk will be secured. Furthermore, to provide a strainer in which the parts shall be capable of ready disconnection for purposes of cleansing, whereby thorough sanitation may at all times be maintained.

With the above and other objects in view, as will appear as the nature of the invention is better understood, the same consists in the novel construction and combination of parts of a strainer, as will be hereinafter fully described and claimed.

In the accompanying drawings forming a part of this specification and in which like characters of reference indicate corresponding parts,—Figure 1 is a view in vertical longitudinal section through a strainer constructed in accordance with the present invention. Fig. 2 is a horizontal plan view taken on the line 2—2 of Fig. 1. Fig. 3 is a collective detail perspective view of a portion of the strainer, the parts being separated and arranged in the order in which they are assembled in use.

Referring to the drawings, 1 designates the receiver or body of the strainer which is herein shown as an inverted truncated structure, and to which is attached a flange 2 that is adapted to fit within a milk or other pail, the flange being provided with a marginal bead 3 to limit its insertion within the bucket or pail.

The bottom 4 of the body is provided with a tubular extension 5 that is circumferentially reduced adjacent to the bottom, to provide a seat 6 to receive a pair of strainers 7 and 8, of which the latter is of relatively coarse mesh and may be constructed either of foraminous or reticulated metal, and the former of fine mesh and constructed preferably of reticulated metal. In order to hold the two strainers 7 and 8 in position the bottom 4 is provided with two inward projecting studs or bosses 9 that, as clearly shown in Fig. 2, project over the strainer 8, which latter is provided in its periphery with a notch 10 to permit it to be positioned relatively to the bottom.

The strainer 7 being of fine mesh may readily be flexed to place it within the seat, but the strainer 8 being relatively stiff it is of advantage to provide the notch 10 referred to for the purpose. When the strainers 7 and 8 are in position, by turning the strainer 8 a short distance to remove the notch from beneath one of the lugs 9, both strainers will be held in position against accidental separation, but may readily be removed for purposes of cleansing.

Combined with the extension 5 is a supplemental strainer, which comprises a cup 11 constituting a trap and having a collar 11$^a$ adapted to fit upon the extension 5 and be held in position by frictional contact therewith. The bottom 12 of the cup is preferably dished, and is provided with a double reduced extension 13, the purpose of which will presently appear. The other elements of the second or supplemental strainer comprise a head 14, a pair of annular strainers 15 and 16, of which the former is of fine mesh and the latter of relatively coarse mesh, a thimble 17 provided with a flange 17$^a$ and an approximately hemispherical cap or deflector 18. The head 14 has an openwork or gridded top 19, from the center of which projects a sleeve 20 that is of the same diameter as the small portion 21 of the extension 13 and is designed to abut thereagainst when the parts of the two strainers are assembled, as clearly shown in Fig. 1. The head, as clearly shown in Fig. 1, is of less cross diameter than the tubular extension 5, whereby there is left a circular passageway 21$^a$ for the escape of milk from the receiver to the trap. The annular strainers 15 and 16 are designed to fit snugly within the head and are held in position therein by the flange of the cap 18. The thimble is of a diameter to fit snugly within the sleeve 20 and the extension 21 of the cup, thereby to hold the head and strainers assembled with the latter, and the cap 18 engages frictionally with the interior of the head 14 and is thus held for ready disconnection therefrom.

It will be seen that by the manner of assembling the parts of the supplemental strainer, separation thereof for the purpose of cleansing may readily be effected so that the article may at all times be kept in a clean and sanitary condition.

In the use of the utensil, the body is positioned upon the pail. As the milk is supplied to the body it passes down through the strainers 8 and 7, and onto cap 18 by which it is deflected towards the passageway 21$^a$ through which it passes to the cap 11, thence upwards through the openings 22 in the head 14 and through the strainers 15 and 16, and thence downward through the thimble into the pail. It will thus be seen that initially any extraneous matter, such as dirt or hairs, will be effectually separated from the milk by the strainers 7 and 8, and that by subjecting it to a second straining through the strainers 15 and 16, any foreign matter that may have passed through the first-named strainers will be caught and retained in the cup 11, whence it may be removed by separating the parts in the manner described.

What is claimed is:—

1. A strainer element comprising a cup, an openwork head, annular strainers disposed within the head, a thimble for holding the strainers, head and collar frictionally assembled, and a cap detachably combined with the head.

2. A strainer element comprising a cup having a reduced extension, an openwork head having a sleeve, annular strainers arranged within the head, a thimble projecting through the extension and into the sleeve and having a flange bearing against the extension, and a substantially hemispherical cap carried by the head.

3. A strainer comprising a receiver provided with means for attachment to a' pail, primary straining elements detachably combined with the receiver, and a supplemental strainer assembled with the receiver and embodying a trap, secondary straining elements arranged therein, and a cap assembled with the trap.

4. A strainer comprising a receiver, primary strainers arranged therein, a trap carried by the receiver, secondary strainers in the trap, and a deflector arranged over the last named strainers and under the first named.

5. A strainer comprising a receiver, primary strainers therein, a trap carried by the receiver, a head disposed within the trap and provided with openings, secondary strainers arranged over the openings, and a deflector carried by the head and covering the last-named strainers and openings.

6. A strainer comprising a receiver having a tubular extension provided with a seat, primary strainers disposed in the seat, a trap engaging the extension, a head arranged within the trap and provided with openings, strainers carried by the head and covering the openings thereof, a thimble for holding the head assembled with the trap, and a deflector carried by the head and covering the secondary strainers.

In testimony that I claim the foregoing as my own, I have hereto affixed my signature in the presence of two witnesses.

WILLARD JONES.

Witnesses:
HARRY MANSER,
NEWTON S. COAN.